UNITED STATES PATENT OFFICE.

GEORGE B. BURNHAM, OF BOROSOLVAY, CALIFORNIA.

PROCESS OF RECOVERING BORAX FROM SALINE WATERS.

1,370,278.

Specification of Letters Patent.   Patented Mar. 1, 1921.

No Drawing.   Application filed June 30, 1919.   Serial No. 307,751.

*To all whom it may concern:*

Be it known that I, GEORGE B. BURNHAM, a citizen of the United States, and a resident of Borosolvay, San Bernardino county, State of California, have invented a certain new and useful Process of Recovering Borax from Saline Waters, of which the following is a specification.

The invention relates to a process of recovering sodium tetraborate from saline waters containing the same, and particularly from the brines of the alkali lakes of the western United States.

An object of the invention is to provide a cheap process for recovering borax from saline waters containing the same.

The invention possesses other advantageous features, some of which, with the foregoing, will be set forth at length in the following description, where I shall outline in full, one form of the process of my invention. I shall describe the process as applied to the brine of Searles Lake in California, but it is to be understood that the process is not limited to this particular brine.

Searles Lake brine contains sodium, potassium, chlorid, sulfate, carbonate, bicarbonate and borate ions. By the process of my invention, I am able to employ natural temperatures for evaporation and cooling, and I prefer to make use of the temperature variations of winter and summer and day and night, but artificial variations in temperature may be employed when desired. However, when carbonates are present, as in Searles Lake brine, the natural temperatures which are employed for evaporation have a greater advantage in the recovery of the more insoluble borax salts, than high artificial temperatures, since at high temperatures a reaction between the carbonates and borates may occur, which may produce decomposition of the sodium tetraborate.

In the preferred form of my process, the lake brine is pumped in the early summer into large solar evaporation ponds, wherein a portion of the water content is evaporated, increasing the concentration of the borax to as high a degree as is possible. As concentration increases, due to evaporation, sodium chlorid is crystallized out. Further evaporation may be carried on in these ponds or the remaining brine may be transferred to other solar evaporation ponds, before other materials begin to crystallize out. Evaporation is then continued, causing sodium chlorid, potassium sodium sulfate and sodium carbonate sulfate to crystallize out. This stage of the evaporation removes sodium, potassium, chlorid, sulfate and carbonate ions from the brine and increases the concentration of the borax. Evaporation in these second ponds or in the first ponds (in the event that the brine is not transferred) is continued until sodium carbonate sulfate ceases to crystallize out and until the sesqui-carbonate of soda (trona) begins to crystallize out and is further continued until the brine becomes saturated with borax. This condition is reached early in the fall. The amount of evaporation in order to reach saturation with borax at this time of the year can be governed by the depth of the brine in the ponds during evaporation in the summer.

The brine is then preferably flowed or pumped into other ponds, in which the brine is cooled, during fall and winter, causing borax to crystallize out. Water may be added to the brine in the cooling ponds to compensate for the evaporation which takes place therein, and thus prevent crystallization of other salts with the borax in these ponds, due to evaporation. When the brine has been sufficiently chilled to cause the crystallization of the maximum amount of borax under the existing temperatures, the remaining brine is flowed from the cooling ponds and the crude borax crystals collected. The chief impurities which crystallize out with the borax upon cooling are carbonate salts, and various methods of refining can be employed, as set forth below.

Instead of removing the brine from the first or second ponds, prior to cooling, the brine may remain in the same pond and on cooling, the borax crystals will be deposited on top of the previously deposited crystals, and subsequently the borax crystals separated from the others. The borax crystals are fine-grained and loose, and are easily removed with a hydraulic dredge, floating on the pond. The previously deposited crystals form a somewhat firmer deposit in the bottom of the pond, forming a surface of demarcation between them and the soft, fine-grained borax crystals, so that removal by hydraulic suction is readily accomplished.

The crude borax salts thus obtained contain other salts as impurities which may be removed in several ways, employing both mechanical and chemical methods. For instance, the recovered crystals may be washed with water, causing the more readily soluble salts to be dissolved, leaving the borax crystals behind.

Several methods of mechanical separation have been employed with success. In one method, the crystals drawn up by the dredge were discharged into a long, narrow pond, in which the coarser salts settled quickly adjacent the end of the discharge pipe and the fine-grained borax crystals floated away and settled in the pond at points remote from the discharge pipe.

In another method, the pumped mixture of brine and crystals was flowed through a trough having a perforated bottom, submerged in a brine vat or pond. The coarse salts passed through the holes in the bottom of the trough and the fine borax crystals were carried along in the brine stream and discharged from the end of the trough into a settling pond. Other mechanical methods of separation using the difference in size of the various crystals have also been employed to advantage.

Besides the recovery of borax, it may be desirable to effect a separation and recovery of the other salts in the brine that crystallize out during the evaporation and cooling stages. In some cases these various salts are deposited in loose and separate crystals and are then very easily subjected to mechanical separation. In other cases the individual crystals are slightly stuck together and in such case are gathered and gently crushed, thereby separating the crystals. The various different salts can then be mechanically separated from each other by making use of the difference in sizes and shapes of the crystals and their different specific gravities. In this way most of the valuable salts can be recovered from the brine.

I claim

1. The process of recovering borax from natural liquors containing sodium, potassium, chlorid, sulfate, carbonate and borate ions comprising evaporating the liquor to crystallize out sodium, potassium, chlorid, sulfate and carbonate salts and increase the concentration of the borate ions and then cooling the resultant liquor to crystallize out borax.

2. The process of recovering borax from natural liquors containing sodium, potassium, chlorid, sulfate, carbonate and borate ions comprising evaporating the liquor to crystallize out sodium, potassium, chlorid, sulfate and carbonate salts and increase the concentration of the borate ions, separating the resultant liquor from the deposited crystals and then cooling the resultant liquor to crystallize out borax and carbonate salts and separating the borax from the deposited salts.

3. The process of recovering borax from liquors containing sodium, potassium, chlorid, sulfates, carbonate and borate ions comprising evaporating the liquor to crystallize out sodium, potassium, chlorid, sulfate and carbonate salts and increase the concentration of the borate ions, separating the resultant liquor from the deposited crystals, adding water to the resultant liquor and then cooling the liquor to crystallize out borax.

4. The process of recovering borax from natural liquors containing sodium, potassium, chlorid, sulfate, carbonate and borate ions, which consists in exposing the liquor to solar evaporation whereby it is kept relatively warm and potassium, sodium, chlorid, sulfate, and carbonate salts are crystallized out and then chilling the liquor to crystallize out borax and separating the borax from the liquor.

5. The process of recovering borax from liquors containing borax, sodium carbonate and other salts, which consists in evaporating the liquor to crystallize out a portion of the other salts, removing the liquor from the deposited crystals, cooling the removed liquor to crystallize out borax and carbonate salts and separating the borax from the carbonate.

In testimony whereof, I have hereunto set my hand at San Francisco, California, this 9th day of June 1919.

GEORGE B. BURNHAM

In presence of—
H. G. PROST.